United States Patent Office 3,498,476
Patented Mar. 3, 1970

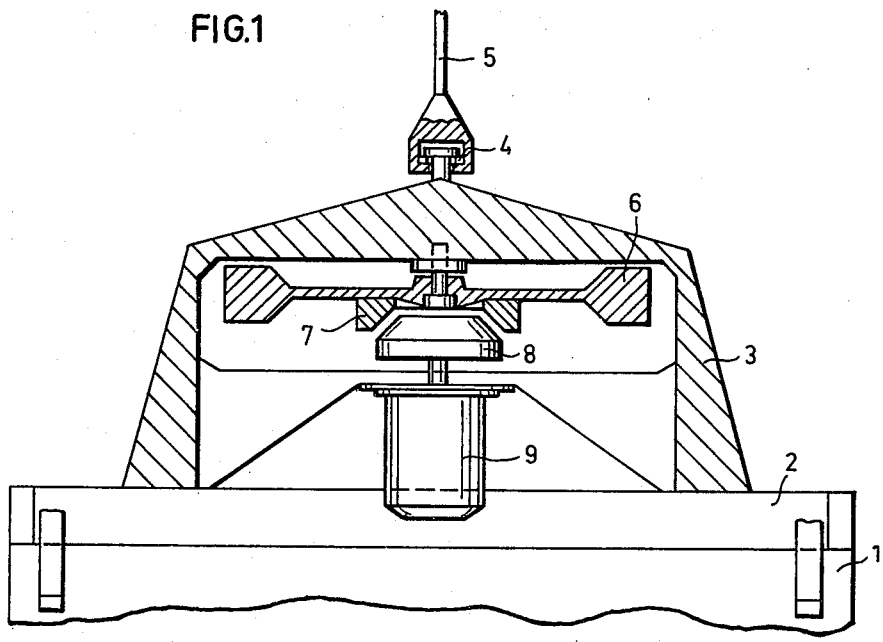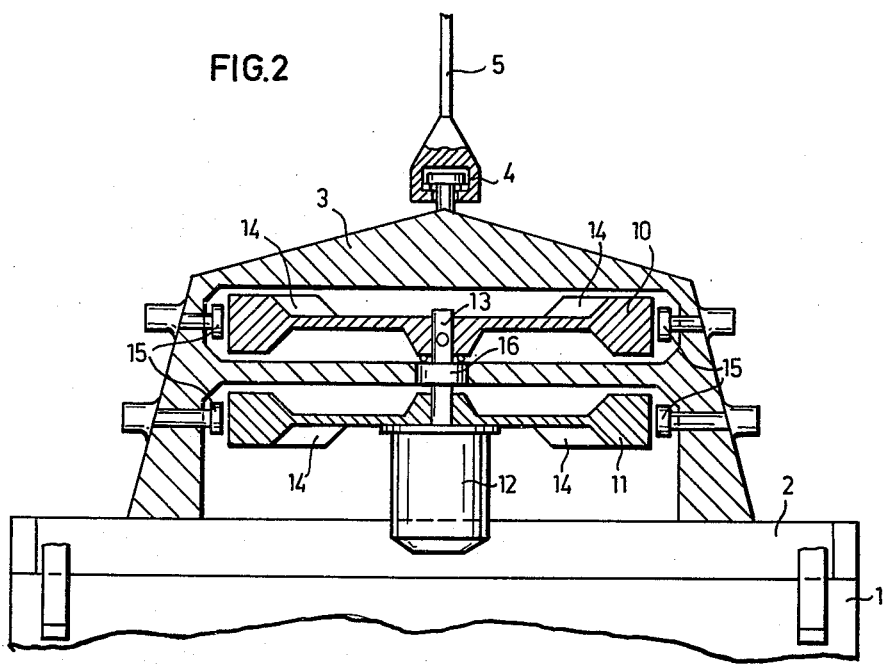

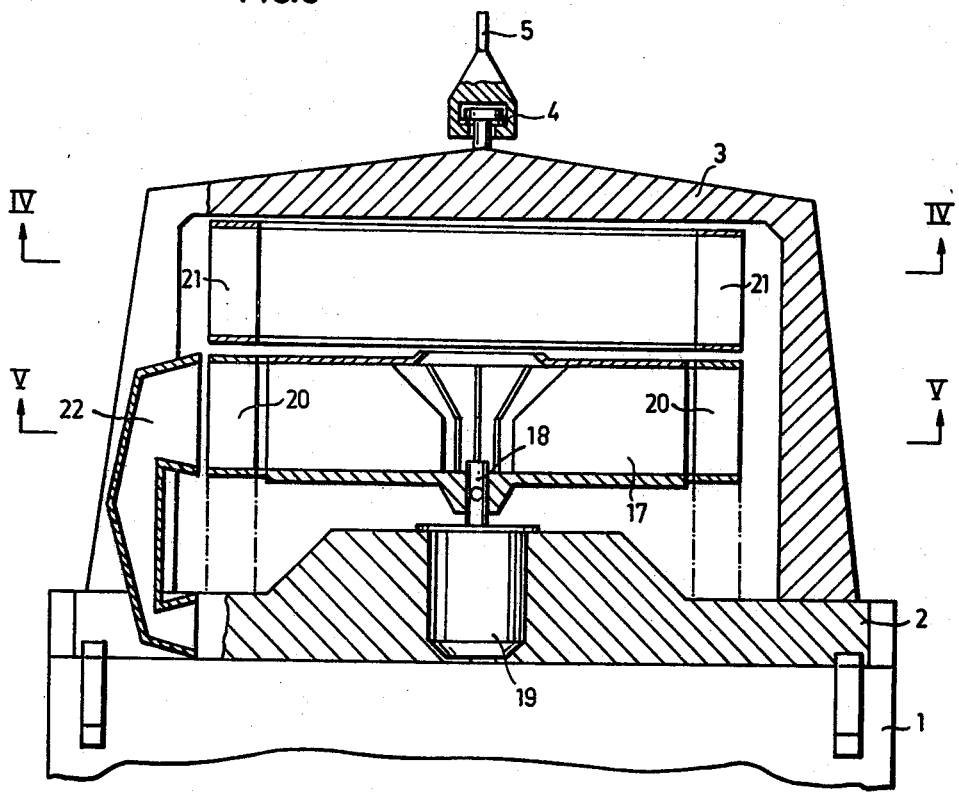

3,498,476
DEVICE FOR ADJUSTING THE POSITION OF A ROTATABLY SUSPENDED OBJECT, ESPECIALLY A LOAD SUSPENDED IN A CRANE
Johan Arne Mattson and Lars Jettman, Vasteras, Sweden, assignors to Byggnadsaktiebolaget Paul Anderson, Vasteras, Sweden, a Swedish corporation
Filed June 21, 1967, Ser. No. 647,854
Claims priority, application Sweden, June 21, 1966, 8,453/66; Feb. 22, 1967, 2,437/67; Feb. 28, 1967, 2,746/67
Int. Cl. B66c 13/04
U.S. Cl. 214—1
12 Claims

ABSTRACT OF THE DISCLOSURE

The invention is concerned with a device for adjusting the position of a rotatably suspended object, e.g. a load suspended in a crane, in order to avoid the risks connected with the turning the load by hand or by special devices necessitating extra staff. On a lifting frame, in which the load is suspended, are mounted rotatable members, driving means for their rotation about a vertical axis, and a device for the production and transmission to the frame of reaction forces derived from the rotation of the rotatable member. Two main embodiments are considered, one in which the rotatable member or members are flywheels, from which reaction forces are derived by acceleration or retardation of the flywheel or wheels, and one in which the rotatable member or members are fan wheels, from which reaction forces are derived by deflecting the air stream produced by the fan wheel or wheels in a direction opposite to the direction of the desired reaction force. The invention also comprises advantageous combinations of these two systems.

---

With cranes having one or several adjacent lines the load has always a tendency to rotate. This causes often great difficulties when the load has to be set down in a predetermined position of rotation. Hitherto the preventing of a rotation of the load or its turning to a predetermined position has been obtained by means of lines or blocks anchored in the ground or on the crane. Thus a line has often been stretched from the load either over a pulley on the crane beam to a special worker or directly to said worker. It has however been most usual to wait until the load was sufficiently near the ground to be within reach of the men's hands, which then have turned the load to the desired position and kept it in this position during the lowering of the load, thereby incurring risks for accidents.

These methods hitherto used for lowering the load in a predetermined position take much time and extra staff. It has been tried to reduce the difficulties by using two or more lifting hooks, which are spaced from each other, so that a rotation of the load cannot occur. In connection with the more and more expensive container traffic cranes with four lifting lines have been constructed, of which each was connected to one corner of a lifting frame, which is mounted onto the upper side of the container. This, however, only permits to determine the position of the load relative to the crane beam and further special devices have to be provided to permit to turn the load to another predetermined position, which is desired in most cases. Such devices make the crane very intricate, heavy and dear besides the necessity of arranging a multiplicity of lines with corresponding pulleys, drums and driving machinery. The same problem can also appear in the use of grabs which are to be lowered to the ground in a predetermined position for gripping or putting down the load.

When lifting a load with only one line or several lines nearly adjacent to each other, it is further necessary to provide a swivel, i.e. a bearing device permitting a relative rotation between the load and the line. Such a swivel is generally placed between the line and the hook, so that a necessary rotation of the load is not transmitted to the lines which are not twisted. The forces which are necessary either to prevent the load from rotation or to rotate the load to a desired position are relatively small and can be active during a comparatively long period of time, i.e. from the moment when the load is lifted to the moment when the load is put down, but if the lifting, turning and lowering time is to be fully utilised for the rotation of the load it is not possible to use turning stays or blocks anchored in fixed points.

To solve this problem it is proposed according to the invention to provide the load with a turning device, which can give the load a turning torque. The turning device according to the invention is characterised in that the load is non-rotatably connected with a frame comprising at least one member, which is rotatable about an essentially vertical axis, a driving mechanism for rotating said rotatable member, and at least one device for the transmission to the frame of reaction forces derived from the rotation of the rotatable member.

These reaction forces can be of two different main types and be obtained either by acceleration and retardation of one or more rotatable members in the form of masses or by deflecting means mounted on the frame for the deflection of air streams produced by one or more rotatable members in the form of fan wheels. Reaction forces of these two kinds can be combined by forming one or more of the rotatable members as flywheels with fan wings and by mounting members both for the acceleration and retardation and for the deflexion of the air streams produced by these fan flywheels.

When producing reaction forces by acceleration and retardation, the rotatable masses can produce a turning torque on the load by being started in a direction opposite the desired direction of rotation of the load. Counter torques for stopping the rotation of the load can be produced by braking the masses to full stop. It is also possible to provide rotatable masses which by a driving mechanism are kept in continuous rotation and which can cooperate with braking members connected to the load. It is further possible to use two oppositely rotating masses with a driving torque acting between them and brakes cooperating with each of these masses in order to rotate the load in one direction by braking one of the rotating masses and to stop the rotation of the load by braking the other mass.

The rotation obtainable by acceleration or retardation of a rotatable mass is limited to the dynamic energy accumulated in the rotating mass or to the maximum rotation speed to which a mass can be accelerated.

By mounting the rotatable mass so that it can be turned about a second axis, which forms an angle with the axis of rotation, e.g., a horizontal axis, it will be possible after having used up the dynamic energy, i.e., when the mass is brought to a standstill, to produce a further reaction force acting in the same direction as that obtained by retarding the mass by turning the mass about 180° around the second axis and accelerating the mass again.

When reaction forces capable to turn a suspended object by reflecting air streams from rotating fan wheels as previously indicated by means of deflecting means arranged on the outlet side of the fan wheels, simple means can easily be provided to produce components of forces acting radially on the load by mounting deflecting means giving a portion of the outlet air stream a desired radial component of direction. By such means tendencies of the suspended object to oscillate about the axis of rotation or to swing in the lifting lines can be effectively suppressed.

Different embodiments of the invention are described in the following with reference to the accompanying drawings:

FIGS. 1 and 2 are diagrammatic views in vertical axial section of two embodiments of the invention adapted on a lifting frame for a container and using reaction forces derived from rotating masses for the rotation of the load.

FIG. 3 is a diagrammatic view in vertical axial section of an embodiment of the invention adapted on a lifting frame for a container and using reaction forces derived from air streams produced by a rotating member.

Figure 4:
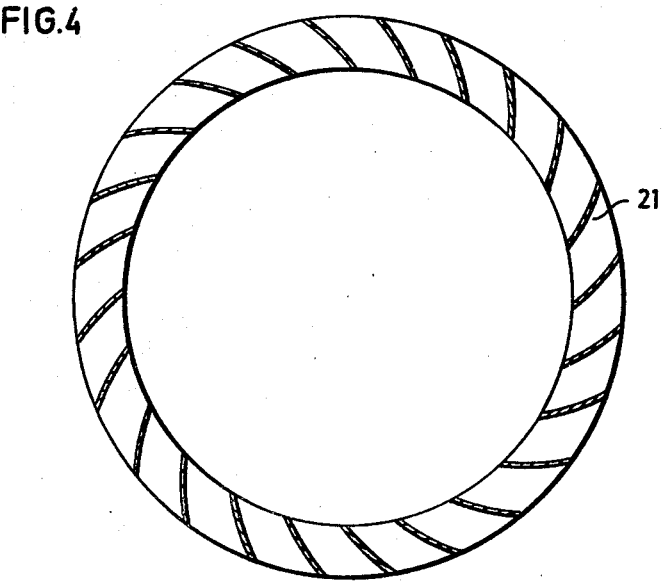
FIGS. 4 and 5 show cross sections taken along lines IV—IV and V—V respectively in FIG. 3.

In these different embodiments reference numeral 1 designates a load, e.g., a container which by fastening members of any known kind is at least momentarily but rigidly connected to a lifting frame 2 with a superstructure 3, suspended by means of a swivel 4 in the line 5 of a crane.

Referring to FIG. 1 the superstructure 3 forms a mounting. A rotatable mass or flywheel 6 is mounted for rotation within the superstructure 3 about a vertical axis coaxial with the swivel 4. This flywheel has a coupling disc 7 forming one half of a friction clutch, the other half 8 of which is also coaxial with the flywheel 6, the swivel 4 and the line 5 and mounted on the shaft of a motor 9. The motor 9 is so constructed, that when it is magnetised the two clutch halves 7 and 8 are engaged and the flywheel 6 depending on the polarity of the magnetising tension applied, is rotated in one direction or the other or the already rotating flywheel 6 is either braked or further accelerated by the motor 9, all depending on the desired direction of the resulting reaction torque tending to turn the load. With the device just described it is possible by simple electric coupling means to exert one or several rotational impulses of different duration on the load according to the desired direction of rotation, the desired rotating speed and the actual mass of the load. An initiated rotation of the load can be stopped at any time by an appropriate braking impulse of appropriate strength and duration, so that the load taken exactly the desired position of rotation relative to the crane at the end of its lowering down.

Under certain circumstances, especially when handling extra heavy loads, it might be inappropriate to transmit the entire weight through the superstructure 3. A reduction of this part can be obtained by making the shaft of the motor 9 and of the flywheel 6 hollow and to connect the part of the bearing 4 which is rotatable together with the load directly with the lifting frame 2 by means of a bar passing through the bore of said shaft. For very large loads the turning device comprising the flywheel, the coupling and the motor can be doubled and each of these two devices can be mounted on either side of a rigid or articulated lifting link connecting the lifting frame 2 directly with the bearing 4. The rotatable mass, its bearings, the clutch and the motor can then be constructed with reduced dimensions and with a simpler construction, but first of all the superstructure 3 can be made much lighter and simpler because it has not to transmit any part of the load. The clutch 7, 8 can also be omitted if the rotatable mass or flywheel 6 is directly connected with the rotor of a motor capable of exerting braking and driving torques in either direction by magnetisation with variable polarity of any appropriate design known within the electrotechnic field.

The device illustrated in FIG. 2 differs from that shown in FIG. 1 thereby, that it has two coaxial rotatable masses or flywheels 10 and 11, of which one 10 is mounted on the shaft 13 of a motor 12 i.e., connected to the rotor of the motor while the other 11 is connected with the stator of the motor. Both flywheels or masses and the motor parts connected therewith are mounted for free rotation in both directions in the superstructure 3 e.g., by means of an axial bearing 16. Both masses are provided with radial wings 14 which form air brakes. Every mass cooperates by its periphery with a braking device comprising each at least two symmetrically arranged brake shoes 15, which are displaceably guided in the superstructure 3 and which can be actuated towards or away from the periphery of the respective mass by electric or hydraulic devices known per se.

In operation both masses are driven with essentially uniform relative speed between each other. Because of the wings 14 the air resistance of which augments very rapidly at augmenting speed, both masses 10 and 11 strive to rotate with equal speed each in its direction. Since both rotatable masses 10 and 11 are relatively large and their motion symmetric, the superstructure 3, the lifting frame 2 and the load 1 are not imparted any resulting torque when the masses are started. If, however, one of the flywheels, e.g., the flywheel 10, is braked more or less by means of the cooperating brake shoes 15, a portion of the inertia torque of the flywheel will be transmitted to the superstructure 3 and to the load, which is thereby rotated in the desired direction. By braking the other flywheel (e.g. 11) the load is rotated in the opposite direction. Every time one of the flywheels 10 or 11 is braked, the motor 12, which strives to maintain a determined relative speed between the flywheels, will accelerate the other flywheel, which can then offer a larger inertia torque for a subsequent stopping of the rotation of the load. In the time interval between the braking of one of the flywheels for initiating the rotation of the load and the braking of the other flywheel for the stopping of the rotation of the load, the air wings 14 will be active for an equalization of the speed of the flywheels relative to the surrounding air. If at a rapid acceleration of the rotation of the load one of the flywheels is braked down to standstill, the motor will by means of the other flywheel still exert a certain torque because the wings 14 of this other flywheel, using the surrounding air as a support, exert an opposite torque on the motor, the blocked flywheel and the load.

Even in this embodiment it will be possible either to connect the swivel 4 with the frame 2 by means of a bar at least partly discharging the superstructure and passing through the hollow shaft of the motor, or to arrange two turning devices of the type shown in FIG. 2 on either side of a bar supporting the load. Even more than two turning devices can be mounted on the load, on a lifting frame supporting the load, a grab, or any other object to be lifted with a crane.

As already indicated the turning capacity of the device can be increased by mounting the rotatable masses for rotation about a second axis, which forms an angle preferably of 90° with the axis of rotation. In this case it will also be possible to use the gyroscopic effects for rotating the load. The rotatable mass can thus be accelerated to an appropriate speed, whereafter the mass is turned about the second axis, whereby a desired torque on the bearings supporting said second axis is obtained. By further acceleration or retardation of the rotatable mass any imaginable combination of gyro-forces and reactions to acceleration and retardation can be obtained.

By the invention it will thus become possible to add to the torques obtainable with the devices according to FIGS. 1 and 2 by acceleration or retardation of the mass or masses further torques acting in the same direction even after the dynamic energy accumulated in the rotatable mass or masses has been consumed or after the largest possible accumulatable quantity of dynamic energy has been reached. This permits to make the rotatable masses considerably smaller than would be necessary if the largest necessary torque in a certain direction had to be obtained by a single acceleration or retardation.

This possibility to reduce the dimensions of the rotatable inertia masses makes it possible to mount them together with the motor in a special frame which is rotatable about a horizontal axis in the superstructure 3 without increasing the overall dimensions of the latter.

Figure 5:
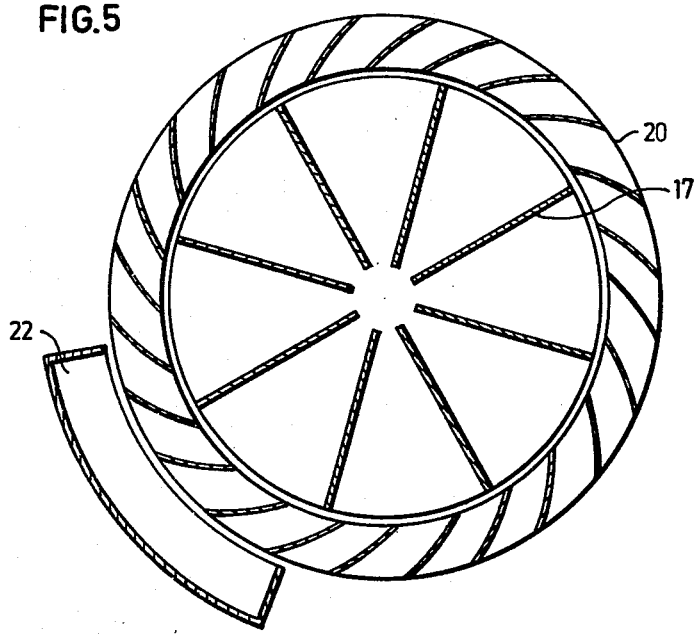

In the embodiment shown in FIGS. 3 to 5 the member rotatably mounted in the superstructure has the form of a radial fan wheel 17 mounted on the shaft 18 of a motor 19. The fan wheel 17 has its circumferential outlet surrounded by a coaxial deflector comprising two guide blade rings 20 and 21, which are unrotatably but simultaneously or individually axially displaceably guided in the superstructure, so that any of the two guide blade rings can be placed to face the circumferential outlet of the fan wheel. The two guide blade rings have their blades inclined in opposite directions, so that the air stream leaving the fan wheel receives a tangential component of motion depending on which of the guide blade rings is in position surrounding the fan wheel. The guide blade rings can also be displaced to intermediate positions so that only a portion of the air stream leaving the fan wheel is deflected tangentially while the remaining portion remains undeflected or is deflected in the opposite direction by the other guide blade ring. Both guide blade rings or deflectors 20 and 21 can be moved entirely outside the outlet air stream of the fan wheel, the ring 21 taking the position illustrated in FIG. 3 while the other ring 20 takes its lowest position indicated in FIG. 3 by dotted lines. With this device any degree or distribution of the deflection of the outlet stream from the fan wheel can be obtained to produce a reaction torque of any desired strength or direction on the superstructure 3 and thereby on the load 1.

In FIG. 3 a further deflector is shown at 22, which by any appropriate means is displaceable into different positions around the axis of the fan wheel and which has a funnel-shaped inlet turned towards the outlet side of the guide blade ring 20 in position around the outlet of the fan wheel 17. As shown in FIG. 5 this further deflector 22 extends over a portion of the circumference of the guide blade ring and has an outlet placed outside the field of action of the air stream and directed in a radial direction opposite that of the outlet stream from the fan wheel. This further radial deflector 22 produces a reaction force directed radially outwards in the direction of the position of the deflector 22 around the axis of the fan wheel. This radial reaction force is sustained by the radial component of direction of the air stream leaving the remaining part of the periphery of the fan device. The radial deflector 22 is preferably also axially displaceable to and from its active position with its inlet facing the fan wheel.

Figure 6:
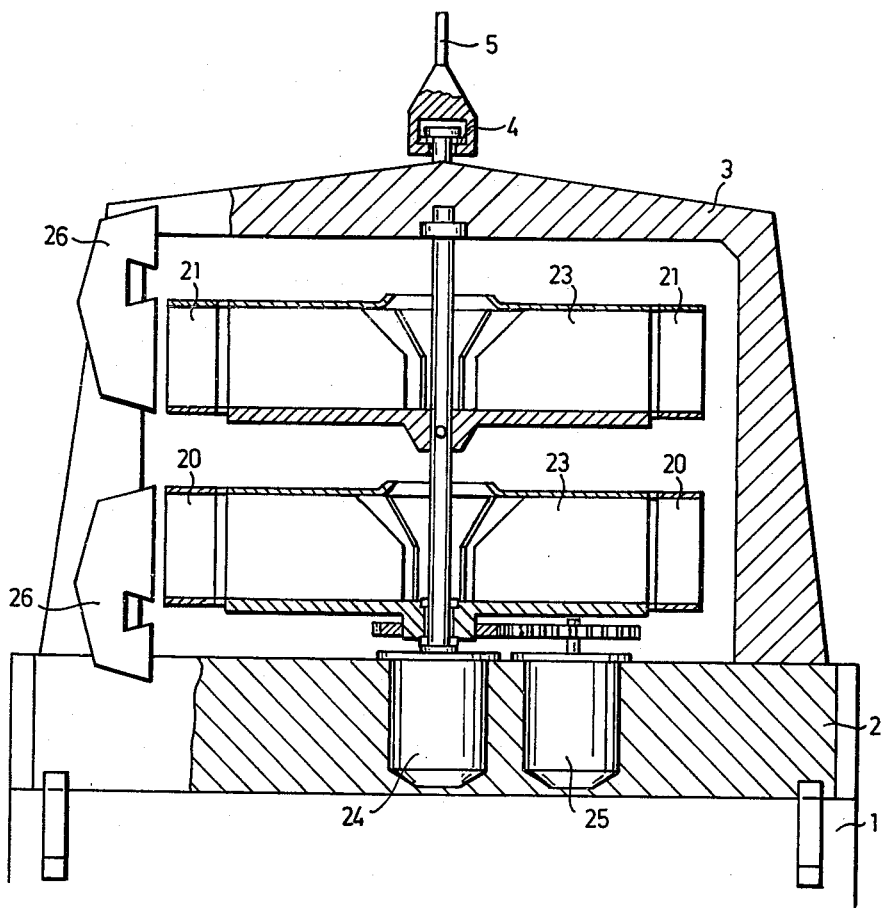
FIG. 6 is a sectional view similar to that of FIG. 3 of a modified device using reaction forces derived from air streams produced by rotating members.

The embodiment shown in FIG. 6 has two fan wheels 23 mounted coaxially above each other in the superstructure 3. The upper fan wheel is fixedly mounted on the shaft of a motor 24, while the lower fan wheel, which is rotatably mounted on said shaft, is driven by a second motor 25. Guide blade rings 20 and 21 with blades inclined in opposite directions as shown in FIGS. 4 and 5 are fixedly mounted each opposite the outlet of one of the fan wheels. The tangential reaction force produced by each guide blade ring is in this embodiment controlled by modifying the speed of the respective motor and thereby the quantity and velocity of the air passing through each of the guide blade rings. Even in this embodiment two radial deflectors 26 are shown, which are displaceable around the axis of the fan and which can produce radial components or reaction forces acting on the load. In case radial reaction components, serving e.g. to damp oscillations of the load in the crane line, are not desired, the radial deflectors 22 in FIG. 3 and 26 in FIG. 6 can be mounted for axial displacement, so that they can be moved out of the air stream leaving the guide blade rings 20 and 21.

Figure 7:
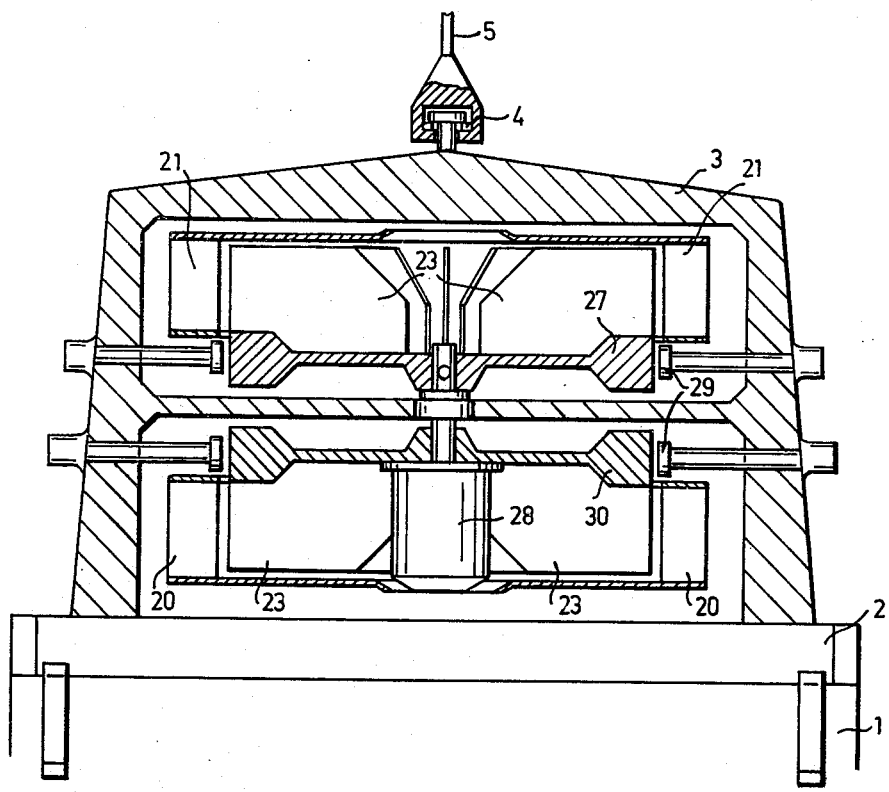
FIG. 7 shows a section similar to that of FIGS. 1, 2, 3, 6 and 7 of an embodiment using combined reaction forces derived from rotating members acting both as masses and as producers of air streams.

The invention can according to FIG. 7 be adapted to a load turning device of the kind illustrated in FIG. 1 or 2, wherein circumferential accelerations and retardations of the load are obtained by accelerating and/or retarding the rotation of rotatable masses 27, which are accelerated by a motor 28 and retarded by brakes 29. In the embodiment shown in FIG. 7 there are two rotatable masses or flywheels 27 and 30 rotating in opposite directions. In such devices it is not possible to produce larger acceleration or retardation torques than corresponds to the dynamic energy accumulated in the flywheels. The available energy can therefore be used up before the load has reached the desired position. By providing the flywheels 27 and 30 with fan wings 23, by driving the flywheels always with the same relative speed, by mounting guide blade rings 20 and 21 of the kind shown in FIG. 6 facing the outlets or the fans and by inclining the blades of the deflectors in such directions, that the reaction force obtained from the guide blade ring facing one of the flywheels acts in the same direction as the reaction obtained by retardation of the other flywheel, the speed thereby increased of the first mentioned flywheel produces an increased air stream and an increased deflector reaction which produces a considerable additional torque to that obtained from the reaction produced by the retardation of the other flywheel.

The invention can also be applied to an embodiment by providing one single rotatable mass capable of producing a torque by acceleration and retardation, by putting fan wings on the mass and by mounting a displaceable or otherwise adjustable tangential deflector or guide blade ring in front of the outlet of the fan wheel thus obtained. New energy in one direction can always be added by feeding energy to the motor, while in the absence of fan wings and deflectors no reactions in the opposite direction can be obtained in a larger extent than corresponds to the dynamic energy fed into the rotating mass. The blades of the deflector are therefore in this case inclined in such a direction, that the reactions produced by the deflection of the air stream act in the same direction as the reaction obtained by retardation of the mass. A device of this kind can also be provided with deflecting means producing radial reaction forces.

What we claim is:

1. A turning device for adjusting the position of rotation of a rotatably suspended object, especially a load suspended in a crane, comprising a frame fixedly connected with the object, at least one rotatable mass mounted for rotation about a vertical axis in said frame, driving means for imparting a rotary motion to said mass or masses, means on said frame for optional controlled acceleration and retardation of said rotary motion, fan wings on said rotatable mass or masses and guide blade means in the path of the air streams produced by said fan wings for deflecting at least a portion of the air stream in a direction producing a reaction force acting in a certain predetermined direction on the load.

2. A device as claimed in claim 1 comprising further radial deflector means in the path of a portion of the air streams produced by said fan wheels.

3. A turning device for adjusting the position of rotation of a rotatably suspended object, especially a load suspended in a crane, comprising: a frame fixedly connected with the object, means for connecting said frame and object to a suspension means, a motor having a stator and rotor carried by said frame, two rotatable masses mounted for rotation about a vertical axis in said frame and connected one with said stator and the other with said rotor of said motor to produce the rotation of the masses in opposite directions, and brake means mounted in the frame for optionally retarding one mass or the other relative to the frame to turn the frame and object in a desired direction about said vertical axis and position the object.

4. A turning device as claimed in claim 3, in which both rotatable masses have air brake wings mounted thereon and are rotatable in the surrounding free atmosphere.

5. A turning device for adjusting the position of rotation of a rotatably suspended object, especially a load suspended in a crane, comprising a frame fixedly connected with the object, means for connecting said frame and object to a suspension means, at least one rotatable mass mounted for rotation about a vertical axis in said frame, driving means for imparting a rotary motion to said mass or masses, brake means for retarding the rotation of the mass or masses, means for transmitting the forces of reaction derived from the acceleration and/or retardation of the mass or masses to said frame and object, in which the rotatable mass or masses and bearing means herefor are as a unit pivotally mounted in the frame about a second axis forming an angle with the axis of rotation.

6. A turning device for adjusting the position of rotation of a rotatably suspended object, especially a load suspended in a crane, comprising a frame fixedly connected with the object, means for connecting said frame and object to a suspension means, at least one rotatable radial fan wheel, mounted for rotation about a vertical axis in said frame, driving means for imparting a rotary motion to said fan wheel or wheels and guide blade means mounted on the frame radially outwards of the fan wheel or wheels in the path of the outlet air stream from the fan to deflect said stream in a tangential direction producing a tangential reaction force acting in a certain pre-determined direction on the load.

7. A turning device for adjusting the position of rotation of a rotatably suspended object, especially a load suspended in a crane, comprising a frame fixedly connected with the object, two rotatable radial fan wheels mounted for rotation about a vertical axis in said frame, separate independent driving means with adjustable speed for each fan wheel and two guide blade rings with opposedly inclined blades surrounding each one of said fan wheels to deflect their outlet streams in opposite tangential direction.

8. A turning device for adjusting the position of rotation of a rotatably suspended object, especially a load suspended in a crane, comprising a frame fixedly connected with the object, at least one rotatable radial fan wheel mounted for rotation about a vertical axis in said frame, driving means for the fan wheel or wheels, deflector means for tangential deflection of at least portions of the air stream leaving the fan wheel or wheels in radial direction, and deflector means for radially deflecting a portion of the radial outlet stream of the fan wheel or wheels into a radial direction opposite to that of said radial outlet air stream.

9. A device as claimed in claim 8, in which the deflector means for radially deflecting the outlet air stream comprise a collecting and deflecting device, which is adjustable into different positions around the axis of the fan wheel or wheels.

10. A device as claimed in claim 8, comprising several collecting and deflecting means positioned around the periphery of the fan wheel or wheels and optionally displaceable axially into and away from an active position facing the periphery of the fan wheel or wheels.

11. A turning device for adjusting the position of rotation of a rotatably suspended object, especially a load suspended in a crane, comprising a frame fixedly connected with the object, at least one rotatable fan wheel mounted for rotation about a vertical axis in said frame, driving means for imparting a rotary motion to said fan wheel or wheels and thereby producing a radial outlet air stream from said fan wheel or wheels, one or more guide blade rings surrounding said fan wheel or wheels to deflect said outlet air stream in tangential direction, radial deflector means positioned on the outside of said guide blade ring or rings to deflect a portion or portions of said radial outlet air stream into a radial direction opposite to that of the deflected portion of said radial outlet air stream.

12. A turning device for adjusting the position of rotation of a rotatably suspended object, especially a load suspended in a crane, comprising: a frame fixedly connected with the object, a rotatable radial fan wheel mounted for rotation about a vertical axis in said frame, drive means for imparting a rotary motion to said fan wheel, and guide blade means mounted on the frame radially outwards of the fan wheel, said guide blade means comprising two guide blade rings with oppositely inclined blades, said rings being axially displaceable to and from an active position surrounding the radial outlet side of said fan wheel to effect the desired deflection of the outlet air stream from the fan in a tangential direction producing a tangential reaction force acting in the desired predetermined direction on the load.

References Cited

UNITED STATES PATENTS

| 2,174,777 | 10/1939 | Carter et al | 74—5.43 |
| 2,192,881 | 3/1940 | DeBothezat | 170—135.28 X |
| 2,736,600 | 2/1956 | Carlson | 294—88 |
| 3,066,753 | 12/1962 | Hurley et al. | 180—120 |
| 3,173,509 | 3/1965 | Wernicke et al. | 180—120 |
| 3,204,467 | 9/1965 | Fischel | 74—5.37 |
| 3,210,114 | 10/1965 | Lawton | 214—1 X |
| 2,009,703 | 7/1935 | Pecker | 188—72 |
| 2,423,625 | 7/1947 | Smith | 244—56 X |
| 2,937,823 | 5/1960 | Fletcher | 244—56 X |
| 3,291,236 | 12/1966 | Foshag et al. | 180—121 |

FOREIGN PATENTS

| 662,030 | 4/1963 | Canada. |
| 993,269 | 5/1965 | Great Britain. |

GERALD M. FORLENZA, Primary Examiner

F. E. WERNER, Assistant Examiner

U.S. Cl. X.R.

74—5.34, 5.43; 214—658; 294—86